J. G. UTZ.
CLUTCH.
APPLICATION FILED NOV. 22, 1910.

1,009,702.

Patented Nov. 21, 1911
2 SHEETS—SHEET 1.

Witnesses
Chas. W. Stauffiger.
A. M. Dow.

Inventor
John G. Utz
By
Attorneys

J. G. UTZ.
CLUTCH.
APPLICATION FILED NOV. 22, 1910.

1,009,702.

Patented Nov. 21, 1911.

2 SHEETS—SHEET 2.

WITNESSES
Chas. W. Stauffiger.
A. M. Dow

INVENTOR:
John G. Utz.
BY
Attorneys.

UNITED STATES PATENT OFFICE.

JOHN G. UTZ, OF DETROIT, MICHIGAN.

CLUTCH.

1,009,702.    Specification of Letters Patent.    Patented Nov. 21, 1911.

Application filed November 22, 1910. Serial No. 593,653.

*To all whom it may concern:*

Be it known that I, JOHN G. UTZ, a citizen of the United States of America, residing at Detroit, in the county of Wayne and State of Michigan, have invented certain new and useful Improvements in Clutches, of which the following is a specification, reference being had therein to the accompanying drawings.

This invention relates to improvements in clutches and more particularly to those of the friction disk type especially adapted for automobile use.

The object of the invention is to provide an arrangement of parts whereby the device may be easily dismounted and removed as a unit for the purpose of inspection or repair and to provide certain other new and useful features in the construction, the invention consisting in the matters hereinafter set forth and more particularly pointed out in the appended claims, reference being had to the accompanying drawings, in which—

Figure 1:
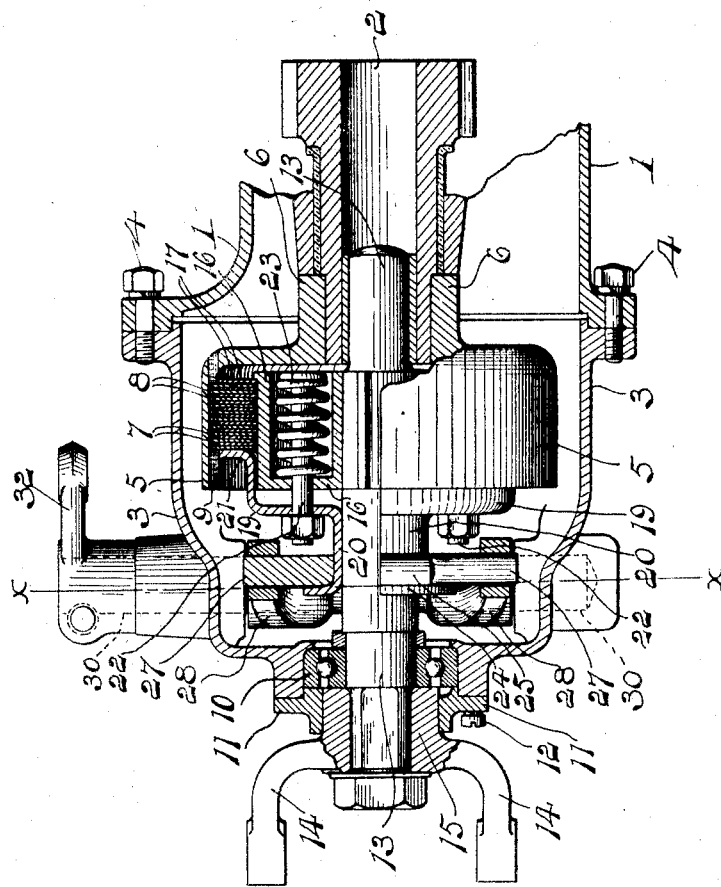
Figure 3:
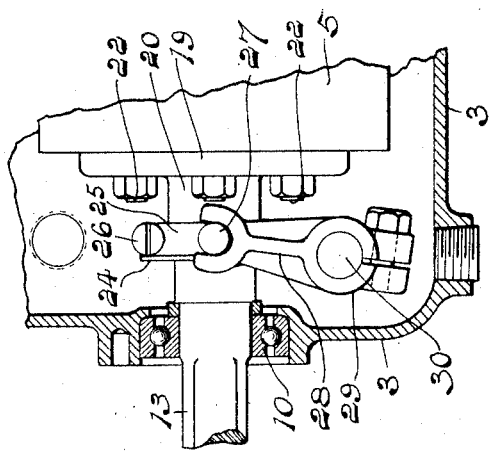
Figure 2:
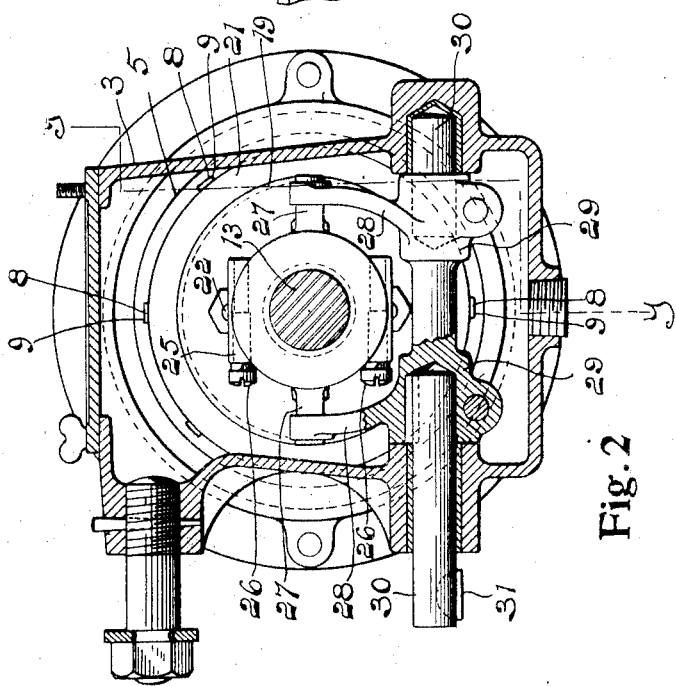

Figure 1 is a view in longitudinal section of a clutch embodying the invention together with portions of a variable speed mechanism; Fig. 2 is a transverse section of the same on the line $x$—$x$; and Fig. 3 is a detail showing a portion of the front end of the device in section substantially upon the line $y$—$y$ of Fig. 2.

As shown in the drawings, 1 is the forward portion of the casing for a variable speed mechanism, in which casing is mounted a tubular shaft 2 forming a part of the variable speed mechanism, the remainder of which is not shown. A clutch casing 3 is detachably secured in any suitable manner to the end of the transmission casing, as by bolts 4 passing through meeting flanges on the ends of the two casings. A drum 5 is formed with a hub 6 keyed or otherwise secured upon the forward end of the shaft 2 to turn therewith and a series of friction rings 7 is carried within the drum and connected thereto to turn therewith by lugs 8 on the rings engaging longitudinal grooves 9 in the inner face of the outer wall of the drum.

An anti-friction end thrust bearing 10 of any preferred type is secured in the forward end of the casing 3 in axial alinement with the shaft 2 by a removable collar 11 secured against the end of the casing by cap screws 12 or the like. A clutch shaft 13 is journaled in axial alinement with the shaft 2 within the bearing 10 with its forward end stepped in the forward end of said tubular shaft with a bearing sleeve interposed, if desired. The forward end of the clutch shaft which extends forwardly from the bearing 10 is squared, splined or otherwise fashioned to engage the hub 15 of one yoke 14 of a universal joint for connecting a shaft (not shown) to the forward end of the clutch shaft 13. The hub 15 of the yoke serves the purpose of a thrust collar opposing a shoulder formed by reducing the diameter of the shaft and coacts with said shoulder to prevent longitudinal shifting of the shaft in the bearing 10.

A spider 16 is secured upon the shaft 13 to turn therewith within the drum 5 and friction disks 17 alternating with the rings 7 are carried upon the periphery of the spider and attached thereto to turn therewith, said disks being held from slipping longitudinally from the rear end of the spider by an end flange 18 on said spider. A collar 19 is formed with a hub portion 20 fitting the shaft 13 and adapted to slide longitudinally thereon and is also provide with a rim portion projecting into the drum outside of the spider and having a flange 21 to engage the foremost disk or ring. The spider is formed with a series of pockets open at their rear ends and bolts or plungers 22 having heads at one end are secured at their opposite ends to the collars 19 and pass freely through holes in the bottom of said pockets. Coiled springs 23 are sleeved upon the plungers under compression between the heads thereon and the bottom of the pockets, and exert a force to draw the collar toward the spider and force the friction rings and disks into frictional engagement to cause the drum and spider to turn together. To move the collar 19 longitudinally against the action of said springs 23 and take the pressure off from the disks and rings so that the drum may turn independently of the spider and its shaft 13, a two part ring 25 is secured together by cap screws 26 about the hub 20 of the slide collar against an end flange 24 on said hub, and this ring is provided with diametrically disposed studs 27 engaged with openings in the ends of the arms of a yoke 28. Said yoke has a split hub 29 within which stub shafts 30 are secured, and these stub shafts are adapted to rock in suitable bearing sockets in the casing 3, one of said shafts being extended through its bearing and provided with a key 31 for securing a suitable operating pedal or lever 32 thereto.

In this construction the entire clutch mechanism, including its casing and operating lever, may be very quickly detached and bodily removed as a unit by removing the bolts 4 and disconnecting the yoke 14 of the universal joint from the other parts of said joint. The clutch drum and shaft may then be withdrawn from engagement with the end of the transmission shaft 2 without affecting the adjustment of the parts of the clutch mechanism. The particular construction of bearing for the transmission and clutch shafts also prevents oil from working through into the clutch casing and insures proper working of the clutch.

Having thus fully described my invention what I claim is:

1. The combination with a variable speed transmission mechanism comprising a casing and a shaft in said casing, of a clutch casing detachably secured to the end of the transmission casing at one end and provided with a bearing at its opposite end in alinement with said transmission shaft, a clutch shaft stepped in the end of said transmission shaft at one end and projecting through said bearing, means on the outer end of said clutch shaft for detachably attaching a shaft thereto, a drum detachably secured upon the end of the transmission shaft to turn therewith, and multiple friction disk mechanism within said drum for connecting said drum and clutch shaft to cause them to turn together.

2. The combination with a variable speed transmission mechanism comprising a casing and a shaft in said casing projecting forwardly therefrom, of a clutch casing detachably secured to the front end of said transmission casing and supported thereby, a bearing in the front end of the clutch casing, a clutch shaft stepped at its rear end in the end of the transmission shaft and extending through said bearing, a universal joint member secured upon the front end of the clutch shaft, multiple friction disk mechanism within the clutch casing for connecting the transmission shaft and the clutch shaft, and means carried by the clutch casing for operating the friction disk mechanism.

3. The combination with a variable speed transmission mechanism comprising a casing and a shaft extending longitudinally of the casing in the front end thereof, of a clutch casing having an open rear end detachably secured to the said transmission casing, said transmission casing forming the sole support for said clutch casing, a bearing in the front end of said clutch casing in alinement with the transmission shaft, a clutch shaft in said bearing in alinement with the transmission shaft, coupling means on the front end of the clutch shaft, a drum in the clutch casing attached to the transmission shaft to turn therewith, a spider secured upon the clutch shaft, friction disks carried by the spider and operatively connected thereto to turn therewith, friction rings alternating with the friction disks and slidable into and connected to the drum to turn therewith, said spider and friction disks and rings being inclosed within the drum and removable longitudinally therefrom with the clutch casing when said casing is detached from the transmission casing, and means for forcing the disks and rings into frictional contact with each other.

4. The combination with a variable speed transmission mechanism comprising a casing and a shaft extending longitudinally of the casing through the front end thereof, of a clutch casing detachably secured to the front end of the transmission casing, a clutch shaft mounted in the clutch casing in alinement with the transmission shaft and extending through the front end of said casing, a coupling member in the front end of said clutch shaft, a drum within the clutch casing secured upon the projecting end of the transmission shaft and provided with grooves in the inner face of its outer wall, friction rings having lugs to engage said grooves and slidable freely into the drum, a spider on the clutch shaft within the drum, friction disks on the spider connected thereto to turn therewith and alternating with said friction rings, means for retaining the disks upon the spider with the rings between them, a collar slidable upon the clutch shaft provided with a peripheral portion extending into the drum to engage the adjacent disk, springs carried by the spider for moving the collar to clamp the rings and disks between it and the said retaining means on the spider, and means on the clutch casing for moving the collar against the action of said springs.

5. The combination with variable speed transmission mechanism comprising a casing having a bearing in its front end and a shaft in said bearing projecting therethrough, of a clutch casing secured at its rear end to the forward end of the transmission casing, an anti-friction bearing in the front end of the clutch casing alined with the transmission shaft, a clutch shaft stepped at one end in the transmission shaft and journaled in said bearing, said clutch shaft being reduced at its forward end to form a shoulder thereon to engage the said bearing, a member of a universal joint having a hub engaging and secured upon the outer end of the clutch shaft and adapted to co-act with said shoulder on the clutch shaft to hold said shaft in place within said bearing, a forwardly open drum within the clutch casing having a hub portion secured upon the transmission shaft, multiple friction disk mechanism carried by the clutch shaft within the drum and removable bodily therefrom with said shaft, and means carried by the clutch casing for operating the clutch mechanism.

6. The combination with a variable speed transmission mechanism comprising a casing and a shaft in said casing projecting forwardly therefrom, of a clutch casing having an open rear end, means for detachably securing said clutch casing at its rear end to the transmission casing to close said clutch casing and support the same, a bearing in the front end of said clutch casing, a clutch shaft extending through said bearing and stepped at its rear end in the end of said transmission shaft to turn freely relatively thereto, a member of a universal joint secured upon the outer front end of the clutch shaft, a forwardly open drum secured upon the end of the transmission shaft within the clutch casing and provided with longitudinal grooves in the inner face of its outer wall, a spider secured upon the clutch shaft within said drum and provided with a series of rearwardly open pockets, friction rings within the drum surrounding the spider and provided with lugs to engage the grooves in the drum, friction disks on the spider between the rings and operatively connected to the spider to turn therewith, a collar slidable longitudinally upon the clutch shaft and formed with a peripheral portion extending into the drum into engagement with the adjacent disk, plungers secured at one end to the said collar and extending through openings in the ends of the pockets and provided with heads within said pockets, coiled springs sleeved on said plungers under compression between said heads and the ends of said pockets, a rock shaft on the clutch casing, and a yoke on said rock shaft to move the said collar.

In testimony whereof I affix my signature in presence of two witnesses.

JOHN G. UTZ.

Witnesses:
  LEWIS E. FLANDERS,
  OTTO F. BARTHEL.